Sept. 8, 1964

D. FRITSCH 3,147,583

CONTACT AND INDEXING MECHANISM

Filed Aug. 5, 1960

INVENTOR
Daniel Fritsch,

BY Diggins + LeBlanc

ATTORNEYS

Sept. 8, 1964                D. FRITSCH                3,147,583
CONTACT AND INDEXING MECHANISM
Filed Aug. 5, 1960                                      2 Sheets-Sheet 2
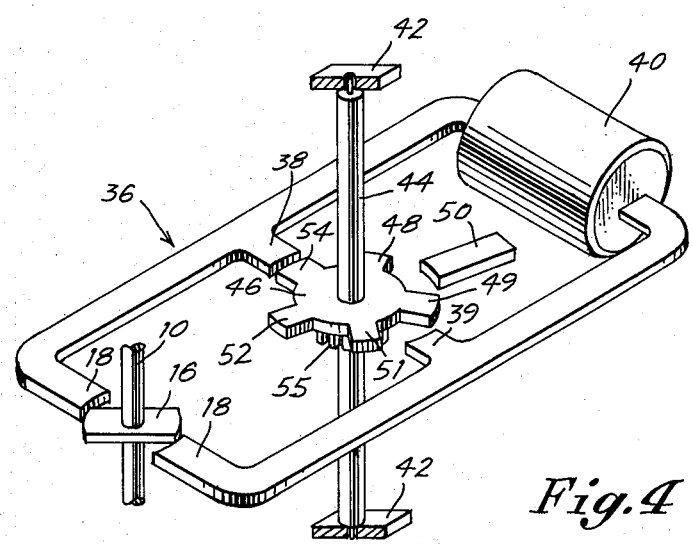
Fig. 4
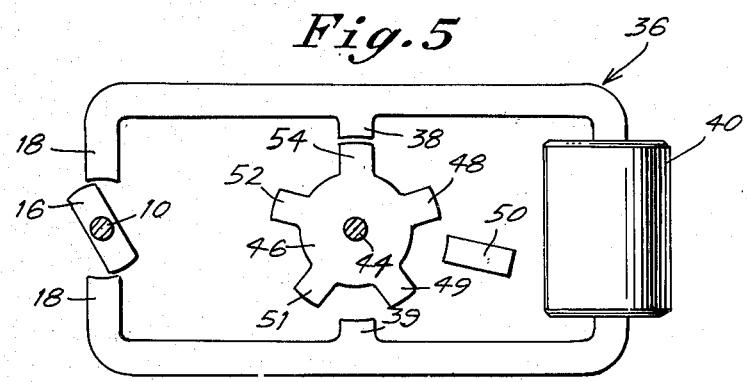
Fig. 5
Fig. 6
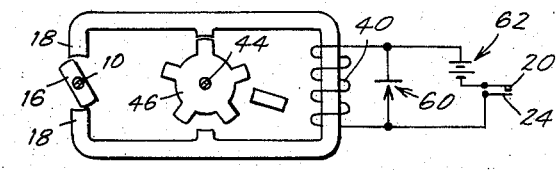
INVENTOR
Daniel Fritsch,
BY Diggins + Le Blanc,
ATTORNEYS United States Patent Office 3,147,583
Patented Sept. 8, 1964

3,147,583
CONTACT AND INDEXING MECHANISM
Daniel Fritsch, Lancaster, Pa., assignor to Hamilton Watch Company, Lancaster, Pa., a corporation of Pennsylvania
Filed Aug. 5, 1960, Ser. No. 47,649
5 Claims. (Cl. 58—28)

This application relates to electric timepieces and more particularly to a novel contact and indexing mechanism for use in electric timepieces.

In Rich Patent No. 2,920,439, there is disclosed an indexing system for an electric timepiece in which the indexing system is magnetically connected to the balance system, all mechanical connections between the two being eliminated. As disclosed by the patentee, such a system provides significant advantages over related prior art systems. For example, the separation of the balance and indexing systems frees the former from the load imposed by the gear train and makes possible a more nearly isochronal mechanism. This factor is extremely significant, of course, since in the course of continued operation of an electric timepiece, the load imposed by the gear train may vary appreciably.

The system of the Rich patent, however, has several significant disadvantages. One of these involves the necessity for reversible magnetic fields, thus requiring electrical contact in each direction of oscillation of the balance wheel or its equivalent. This imposes an appreciable drain on the power source (i.e., a battery) and, especially in the case of an electric watch where the power source is necessarily miniaturized, limits the life of the power source. Secondly, the Rich device relies upon the inertia of a rotating slave rotor (armature 5) to assure rotation of the indexing mechanism in one direction only, since no detent or equivalent mechanism is provided to assure such unidirectional rotation. Since the slave rotor is mechanically linked to the gear train of the timepiece in the Rich structure, it will be readily apparent that the inertia necessary to maintain the rotation of the slave rotor in a single direction will be difficult to obtain and then only if the gear train is sufficiently stepped-down to result in the proper degree of rotation of the time indicating means.

It is accordingly a primary object of the present invention to provide a novel indexing mechanism for use in electric timepieces possessing the significant advantages of the indexing mechanism of the type disclosed in the Rich patent, while eliminating the several disadvantages of such a system.

It is another primary object of the present invention to provide a novel indexing mechanism using a slave rotor to physically drive the gear train, with the slave rotor being mechanically disconnected from the balance system of the timepiece.

It is still another principal object of the present invention to provide a novel indexing mechanism for an electric timepiece comprising a magnetically actuated slave rotor and including a detent mechanism for assuring unidirectional rotation of the slave rotor.

It is a further object of the present invention to provide a novel contact mechanism for use in electric watches which makes possible reliable yet quick-breaking contact to insure against arcing, and which places the contact elements in wiping engagement to insure continued smooth contact through prolonged operation of the timepiece.

Further objects and advantages of the present invention will become apparent upon reference to the specification and claims, and appended drawings wherein:

FIGURE 4 is an isometric view of the novel indexing mechanism of the present invention, partly broken away for clarity of illustration;

FIGURE 5 is a top plan view of the mechanism illustrated in FIGURE 4; and

FIGURE 6 is a partially schematic diagram of a modified form of the indexing mechanism of FIGURES 4 and 5.

Figure 1:
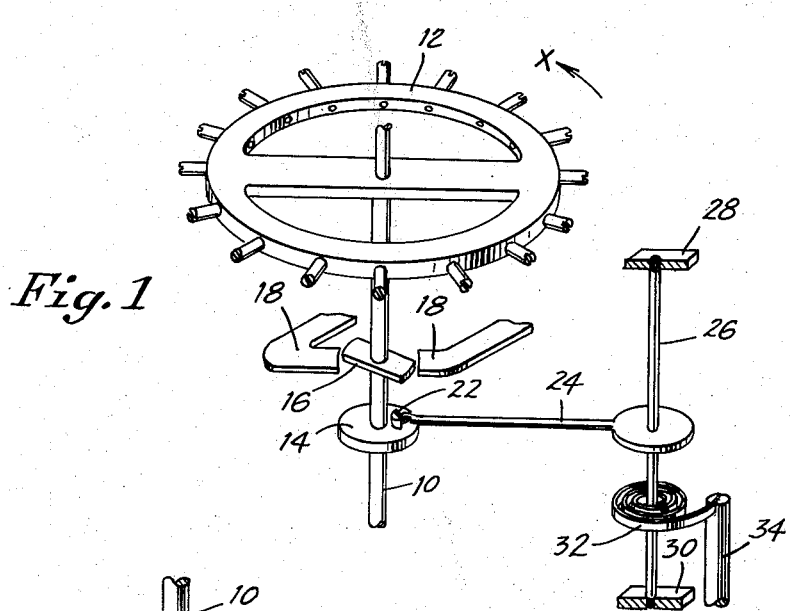
FIGURE 1 is a perspective view of the novel contact mechanism of the present invention, partly broken away for clarity of illustration.

As shown in FIGURE 1, a balance staff 10 supports a balance wheel 12, a roller table 14 and an armature 16 intermediate said roller table and balance wheel. Armature 16, which is preferably constructed of Mumetal, is positioned intermediate the ends of pole pieces 18 forming part of an electromagnet 36 (see FIGURES 4 and 5). Details of the involved structure and the timekeeping mechanism in which it may be used may be obtained by reference to Koehler Patent No. 2,662,366.

Figure 2:
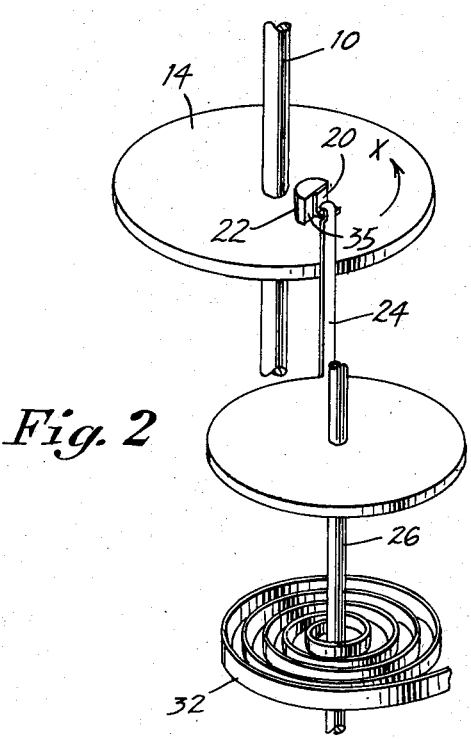
FIGURE 2 is an enlarged view of the contact elements shown in FIGURE 1.
Figure 3:
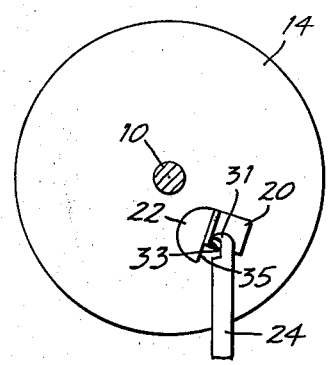
FIGURE 3 is a top plan view of the roller table of the contact system shown in FIGURES 1 and 2.

Roller table 14 carries a contact post 20 and an insulated pin 22 (refer to FIGS. 2 and 3) of semi-circular cross section which are adapted to be engaged in a manner to be described below by a contact arm 24 pivotally mounted on a post 26 which is mounted in insulating bearings 28 and 30. Though contact post 20 is illustrated in FIGURES 1–3 as being separate from though abutting pin 22, the two may be integrally formed by providing one portion of the planar side of the latter with a layer of conductive material. As best shown in FIGURES 2 and 3, the free end of contact arm 24 is provided with a contact tip 31 and a shoulder 33 spaced therefrom. Contact arm 24 is biased into a neutral position at the approximate rest position of roller table 14 by means of a coil spring 32 fixed at one end to post 26 and at the other to an insulatedly mounted post 34 (refer to FIG. 1).

An electric circuit is completed through electric communication between one end of the electromagnetic coil 40 (see FIGURES 4 and 5) with contact post 20 and the other end of the coil with insulatedly mounted post 34 in a conventional manner (see, for example, said Koehler Patent No. 2,662,366).

As is best best illustrated in FIGURES 2 and 3, contact post 20 comprises an L-shaped, electrically conductive member whose upstanding leg abuts against the planar side of pin 22. The width of post 20 is less than that of the planar side of pin 22 so as to leave exposed a portion 35 of the latter as shown in FIGURE 3. Post 20 and pin 22 are positioned on roller table 14 so that the upstanding leg of post 20 and planar side of pin 22 will be disposed at an angle to the longitudinal axis of contact arm 24 at the moment of contact of the latter with post 20.

Details of the novel indexing mechanism of the present invention are illustrated in FIGURES 4 and 5. The indexing system includes an electromagnet indicated generally at 36 and comprising pole pieces 18, pole pieces 38 and 39, a coil 40 and, as indicated above, an oscillatable magnetizable armature 16 mounted on balance staff 10. Insulatedly mounted in bearings 42 by means of a shaft 44 is a soft iron armature 46 having an odd number of projections 48, 49, 51, 52 and 54. Positioned alongside armature 46 for a reason to be presently described is a permanent magnet 50. Magnet 50 is located either to the left or to the right of pole pieces 38 and 39 and is positioned alongside armature 46 in such a manner that when one of the projections of armature 46 (i.e., projection 54) is exactly in line with one of the pole pieces (i.e., pole piece 38), magnet 50 must be positioned between two other projections (i.e., projections 48 and 49) at a point separated from one of said other projections by more than one quarter of the distance between them other than the midpoint of said distance. Shaft 44 is provided with a pinion 55 which is meshed into the gear train of the timepiece (not shown) in a conventional manner.

The operation of the novel indexing and contact mechanism of the present invention is as follows:

During rotation of balance wheel 12 in direction X (see FIGURES 1 and 2), contact arm 24 will come into contact with contact post 20 at approximately the rest position of the balance wheel and close the electric circuit. Closing of the circuit energizes electromagnet 36, causing armature 16 to rotate to a point at which its longitudinal axis is aligned in the magnetic field between pole pieces 18. Rotation of armature 16 results in the kicking of balance wheel 12 in direction X and provides the impulse necessary to maintain the balance wheel in oscillation.

As will be apparent from FIGURES 2 and 3, as balance wheel 12 oscillates in direction X, contact arm 24 will first come into engagement with contact post 20 at a point approximately midway between the sides of the later. Since contact post 20 is angularly disposed to the longitudinal axis of contact arm 24 at the moment of contact, however, continued rotation of roller table 14 will cause the contact tip 31 of contact arm 24 to move along contact post 20 in sliding engagement therewith towards exposed portion 35 of pin 22, the spring mounting of contact arm 24 permitting its deflection. Contact arm 24 and contact post 20 will remain in engagement until shoulder 33 of the former is abutted by exposed portion 35 of insulated pin 22. Since the exposed portion 35 of insulated pin 22 is at a greater distance from balance staff 10 than is contact post 20, it will be moving at a greater velocity than the later and will accordingly end to kick contact arm 24 abruptly away from contact post 20 to assure an arc-free separation of the two. As will be apparent, contact post and insulated pin 22 are so positioned relative to one another that no contact with contact arm 24 will be made in the clockwise movement of balance wheel 12.

During the energization of electromagnet 36 upon engagement of contact arm 24 with contact post 20, a magnetic field will be created not only between pole pieces 18 but will be shunted across pole pieces 38 and 39, as well. Since the intensity of the latter magnetic field will be greater than the magnetic pull of magnet 50, pole 38 will attract projection 54 on armature 46 to cause said armature to rotate in a clockwise direction (as shown in FIGURES 4 and 5). Since armature 46 is provided with an odd number of projections, only one such projection will be in alignment with pole pieces 38 and 39 during energization of electromagnet 36.

When contact has been broken and the electromagnet has been deenergized, magnet 50 will attract the projection closest to it and cause armature 46 to rotate accordingly. Since magnet 50 is positioned at a point relative to projection 48 (as viewed in FIGURE 4) at a point less than half the distance between said projection and projection 49 it will necessarily attract the former and cause armature 46 to rotate a proportional angular distance. And since the distance separating magnet 50 and projection 48 is more than one quarter of the distance between that projection and projection 49, magnet 50 will cause armature 46 to rotate sufficiently so that projection 49 is closer to pole piece 39 than are any of the other projections to either of pole pieces 38 and 39. As a result, upon reenergization of electromagnet 36, projection 49 will be attracted to pole piece 39 and further rotation of armature 46 in a clockwise direction will result. When electromagnet 36 is deenergized, magnet 50 will again attract the closest projection on armature 46, and the process will be repeated. Since shaft 44 is provided with a pinion 55 which is geared into the gear train of the timepiece, it will be seen that rotation of balance wheel 12 will result in movement of the gear train in a manner well known in the art.

A modified form of the indexing mechanism of FIGURES 4 and 5 is schematically illustrated in FIGURE 6. As there shown, a rectifier 60 is shunted across the electromagnet coil 40 with its cathode connected to the positive terminal of a battery (or other power source) 62. This arrangement will have no appreciable effect on the operation of the mechanism when current is flowing through the system through the closing of contacts 20 and 24 due to the high back resistance presented by the rectifier to normal current flow, but will accelerate the collapse of the field of coil 40 when the circuit is broken.

It will be clear from the foregoing that the novel contact and indexing mechanism of the present invention provides numerous advantages. For example, the unique contact assures positive wiping engagement between the contact arm and the contact post which is self-cleaning and obviously desirable for the continued satisfactory operation of the electric timepiece. At the same time, the simple construction of the contact post and insulated pin, which may be integral if desired, facilitates fabrication of the timepiece while permitting the contact to be broken sharply to prevent arcing and further permitting contact to be made in one direction of oscillation only to conserve on battery strength.

The novel indexing mechanism of the present invention provides a truly effective magnetic interlock between the balance and indexing systems to avoid inaccuracies in timekeeping due to variations in the load imposed upon the indexing mechanism. The magnetic detent which is provided assures reliably unidirectional rotation of the indexing mechanism without reliance upon the inertia of a moving wheel.

The invention may be embodied in other specific forms without departing from the spirit or essential characteristics thereof. For example, in lieu of a permanent magnet for use as a detent, other detent means may be utilized, including a completely mechanical detent structure such as that shown in Ensign et al. Patent 2,757,545. Secondly, armature 46 is not limited to a structure having the number of teeth shown in FIGURES 4 and 5, but may have a larger or smaller number. If desired, teeth of the configuration of those on the index wheel described in assignee's copending application No. 18,326, filed March 29, 1960, may be utilized. In addition, the mechanism of the present invention is not restricted to one in which electrical contact will be made in only one direction of operation of balance wheel 12, but also contemplates energization of electromagnet 36 in both directions of operation of the balance wheel. This can be accomplished by elimination of insulated pin 22 on roller table 14. For reasons set forth above, however, energization of the circuit in one direction only is preferred.

The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An electric timepiece having contact and indexing mechanisms for imparting the driving force to the gear train of said timepiece comprising a balance system including a balance staff; contact making and breaking means periodically actuated upon oscillation of said balance staff; a magnetically unpolarized magnetizable rotary armature; magnetic field producing means for producing a field about said rotary armature; said magnetic field producing means being periodically energizable upon actuation of said contact means and being effective to impart a driving impulse to said balance staff upon energization thereof; said armature being provided with means effecting unidirectional rotation of said rotary armature upon energization of said magnetic field producing means; and means actuated by rotation of said rotary armature to impart the driving force to the gear train of said timepiece; said contact making and breaking means comprising contact support means supported by said balance staff and oscillatable therewith; a contact post on said support means coupled to an electric power source; said contact post having an electrically insulated portion and an electrically conductive portion; a contact arm coupled to said electric power source and acting to close an electric circuit upon contact with the conductive portion of said contact post; said contact arm being provided with means to engage the insulated portion of said contact post at a time subsequent to the engagement of said contact arm with the conductive portion of said post and to kick the contact arm out of engagement with said conductive portion.

2. An electric timepiece having contact and indexing mechanisms for imparting the driving force to the gear train of said timepiece comprising: an oscillating balance staff; contact support means mounted on said balance staff and oscillating therewith; a contact post on said contact support means coupled to an electric power source; said contact post having an electrically insulated portion and an electrically conductive portion; said insulated poriton being further removed from said balance staff than said conductive portion; a pivotally mounted contact arm having nose and shoulder members coupled to said electric power source and acting to close an electric circuit upon engagement of said nose member with the conductive portion of said contact post; said shoulder on said contact arm being located closer to the pivotally mounted end of said contact arm than said nose member of said contact arm; said shoulder member of said contact arm engaging the insulated portion of said contact post subsequent to the engagement of the nose member of said contact arm with the conductive portion of said contact post thereby kicking said contact arm out of engagement with said conductive portion whereby the engagement of the nose member of said contact arm with the conducting portion of said contact post delivers an impulse of electrical energy from said power source to said indexing mechanism to impart the driving force to the gear train of said electrical timepiece.

3. An electric timepiece as defined in claim 2 wherein said insulating and conductive portions of said contact post present substantially planar surfaces positioned on said contact support means so as to be disposed at an angle to the longitudinal axis of said contact arm at the point at which said arm engages the conductive portion of said contact post.

4. The electric timepiece of claim 2 wherein the insulated portion of said contact post is effective to prevent closing of the electric circuit in one direction of oscillation of said balance staff.

5. An electric timepiece as defined in claim 2 wherein said contact arm is spring biased to a neutral position located at approximately the rest position of the said balance staff.

References Cited in the file of this patent

UNITED STATES PATENTS

| | | |
|---|---|---|
| 448,326 | Eickemeyer | Mar. 17, 1891 |
| 853,648 | Powers | May 14, 1907 |
| 2,012,207 | Walton | Aug. 20, 1935 |
| 2,195,311 | Hurst | Mar. 26, 1940 |
| 2,574,997 | Askren | Nov. 13, 1951 |
| 2,685,655 | Saint Vaulry | Aug. 3, 1954 |
| 2,806,908 | Van Horn et al. | Sept. 17, 1957 |
| 2,814,692 | Van Eyk | Nov. 26, 1957 |
| 2,854,660 | Best et al. | Sept. 30, 1958 |
| 2,864,018 | Aeschmann | Dec. 9, 1958 |
| 2,867,762 | Lehman et al. | Jan. 6, 1959 |
| 2,868,924 | Hewitt et al. | Jan. 13, 1959 |
| 2,891,377 | Ayres | June 23, 1959 |
| 2,905,904 | Sargeant | Sept. 22, 1959 |
| 2,920,439 | Rich | Jan. 12, 1960 |
| 2,954,642 | Jackson | Oct. 4, 1960 |
| 3,016,685 | Reese | Jan. 16, 1962 |

FOREIGN PATENTS

| | | |
|---|---|---|
| 290,656 | Switzerland | Aug. 1, 1953 |
| 1,080,933 | Germany | Apr. 28, 1960 |

UNITED STATES PATENT OFFICE
CERTIFICATE OF CORRECTION

Patent No. 3,147,583

September 8, 1964

Daniel Fritsch

It is hereby certified that error appears in the above numbered patent requiring correction and that the said Letters Patent should read as corrected below.

Column 3, lines 21 and 33, for "later", each occurrence, read -- latter --; line 34, for "end" read -- tend --; column 5, line 23, for "poriton" read -- portion --.

Signed and sealed this 27th day of April 1965.

(SEAL)
Attest:

ERNEST W. SWIDER
Attesting Officer

EDWARD J. BRENNER
Commissioner of Patents